April 14, 1931.  E. INGOGLIA  1,801,160
BREAD MOLD
Filed May 24, 1930
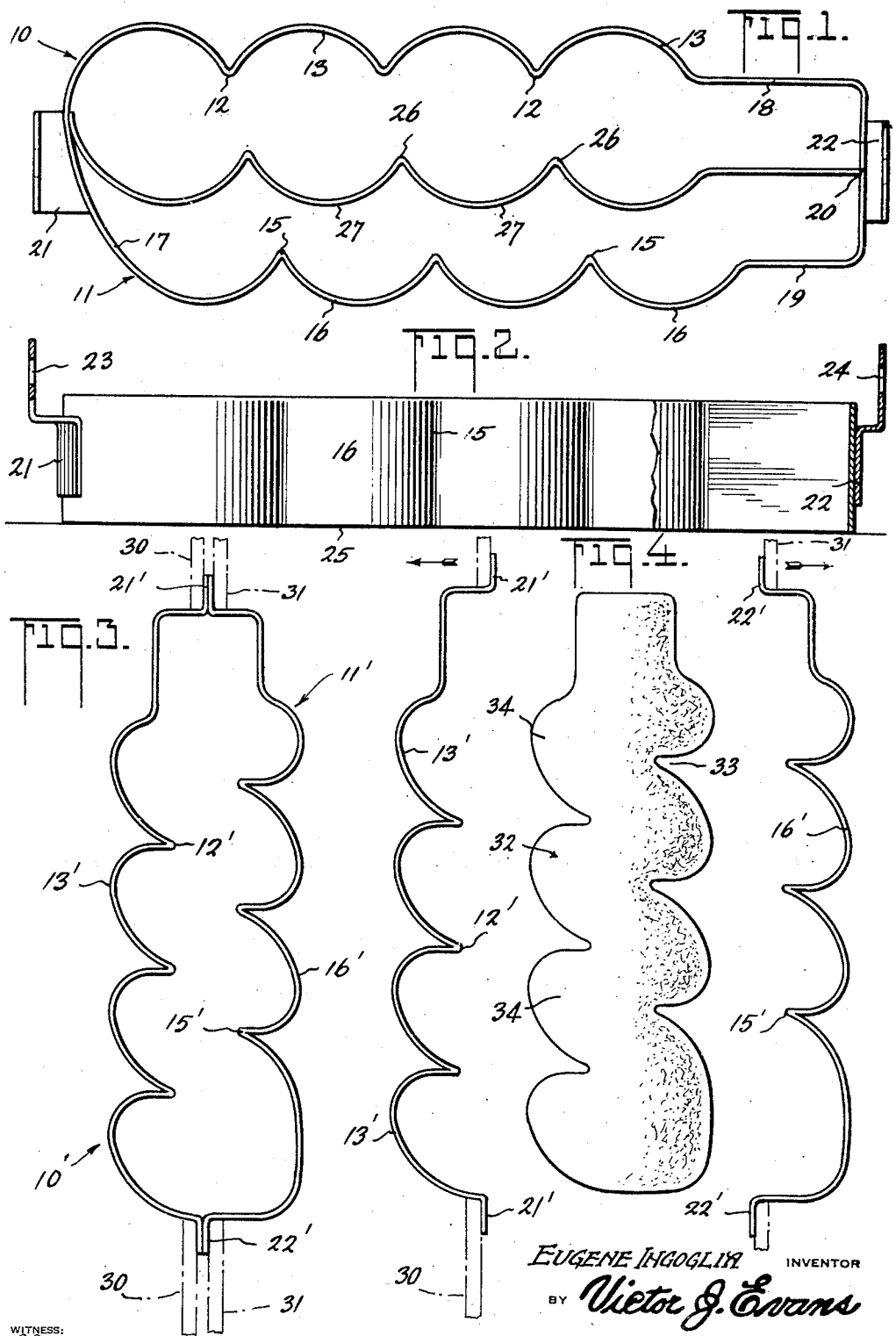

Patented Apr. 14, 1931

1,801,160

UNITED STATES PATENT OFFICE

EUGENE INGOGLIA, OF BROOKLYN, NEW YORK

BREAD MOLD

Application filed May 24, 1930. Serial No. 455,361.

My present invention relates to the art of bread making, in which quantities of dough, previous to the baking thereof, are struck or formed into predetermined shapes; and an important object of the invention is the provision of a mold or form for advantageously shaping dough, so that the resultant loaf or roll following the baking operation, may be of neat and attractive appearance, while the bread may at the same time be more thoroughly baked with a given quantity of heat.

As it has heretofore been customary to provide loaves or rolls of bread of conventional type, such as twisted loaves, and as manual twisting of kneeded flour is a tedious operation, involving increased labor with consequent expense, another object of the invention, connected with the foregoing, is not only to provide an apparently twisted loaf in a briefer period, but also a form of bread in which twisted or zigzagged portions are so disposed as to insure improved and uniform baking.

By providing a mold, in accordance with a further object of the invention, in which coacting sections, each including alternate inwardly projecting and expanded portions, are so disposed as to transversely align the inward projections of one section with the expansions of another, the result is that the cross sectional dimensions, taken at any selected points, of dough formed between the sections are practically identical. Therefore, while heat passes readily to the center line of the dough, the loaf is uniformly baked.

Furthermore, to dispense with manual twisting, the kneeded flour being formed into a straight roll, the mold form sections are mechanically advanced on the roll, from opposite sides of the latter, to secure a loaf of the desired corrugated appearance, this being to secure a still further object of the invention.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawing, which latter shows embodiments of the invention as at present preferred.

In said drawing:

Fig. 1 is a top plan view of a novel mold;

Fig. 2 is a partly sectional side elevational view thereof;

Fig. 3 is a top plan view of a modified form of mold; and

Fig. 4 is a view similar to Fig. 3, but showing the parts in spaced relation.

Referring particularly to the drawing by reference characters, the numeral 10 designates one lateral section of a bread mold or form, which, struck out from or otherwise formed of sheet metal, also includes an opposed section 11. These sections are corrugated or zigzagged in form; that is to say, while the section 10 is provided with sharp turns or inward projections 12, and with outwardly disposed portions or expansions 13, the other section is formed with projections 15, and with interposed expansions 16.

Between the lateral sections 10, 11, at one end thereof is a connecting terminal portion 17, preferably arcuate in form, while at the other end of said sections are parallel portions 18 and 19, the angularly disposed terminals of which contact at 20. The opposite ends of the mold have metallically attached thereto manipulating portions or handles 21, 22, which may have apertures 23, 24 therein.

In order to provide an attractive loaf, resembling bread of the "twist" type, the inward projections 12 of one section are disposed about opposite the expansions 16 of the other section. While the bottom edges of the respective sections and portions, as at 25, serve as cutting edges, to dispense with the manual twisting operation, the sections 10 and 11 have therebetween an insertible strip, which, terminally contacting with the ends of the said sections, is also provided with projections 26, and interposed curved portions or expansions 27.

Since the dough, in this instance, is placed in flat condition on any suitable surface, and since the interposed strip is provided with a base edge, like that shown at 25, a loaf resulting from the baked dough is divisible on the line of the said strip. While that quantity of the dough or loaf formed between the strip and the section 10 takes the twisted or zigzagged appearance already referred to, that part of the loaf formed between the said strip and the section 11 takes another novel zigzagged appearance, as becomes apparent on inspection of Fig. 1.

In the embodiment of the invention illustrated in Figs. 3 and 4, the projections 12' and 15', and the expansions 13' and 16', are like those already described. In this case the sections 10' and 11' are separable, and since the terminals 21' and 22' are responsive to any actuators 30, 31, it follows that the said sections are rapidly movable inwardly and outwardly against a straight roll of dough, to finally provide a novel form of loaf 32, in which the indentations 33 and protuberances 34 correspond respectively to the projections 15' and expansions 13' of the mold. A mold may be of any desired length.

In the embodiment last described, a dough loaf shaped according to the invention by the use thereof, is readily released from the mold, the latter being separable. In connection with the mold of Figs. 1 and 2, however, the use of the method and apparatus disclosed and claimed in my copending application Ser. No. 455,050, and involving the cutter or cleaner of Fig. 1 thereof (suitably reshaped of course as to the working elements thereof) is a feature of the present invention.

The hereinbefore described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What is claimed is:

1. A method of constructing a zigzag loaf, consisting in forming a straight roll of dough, simultaneously moving zigzag mold sections against opposite sides of the roll, the projections of one section being opposite the indentations of the other section; and removing the mold sections and baking the zigzagged roll.

2. A device of the kind described, comprising a combined dough cutter and bread mold including an elongate structure having side and end portions of sheet metal, each of said side portions being laterally bent inwardly and outwardly toward and away from each other at alternating portions to define a plurality of lateral projections directed toward the opposite side portion and intervening expansions directed away from the opposite side portion, said projections on one of said side portions being staggered relative to the projections on the opposite side portion and being so arranged as to provide an elongate cavity between the two side portions outlining the characteristic shape of a twist loaf of bread.

In testimony whereof I hereby affix my signature.

EUGENE INGOGLIA,